Oct. 3, 1967

A. C. IHRIG 3,345,150

APPARATUS FOR MANUFACTURING GLASS

Filed March 20, 1964

INVENTOR.
Allen C. Ihrig

BY *Clarence R. Patty Jr.*

ATTORNEY

United States Patent Office 3,345,150
Patented Oct. 3, 1967

3,345,150
APPARATUS FOR MANUFACTURING GLASS
Allen C. Ihrig, Corning, N.Y., assignor to Corning Glass Works, Corning, N.Y., a corporation of New York
Filed Mar. 20, 1964, Ser. No. 353,505
4 Claims. (Cl. 65—184)

ABSTRACT OF THE DISCLOSURE

In the delivery of molten sheet glass by the over the lip process, control blocks are positioned adjacent each lateral edge of the inclined delivery lip so as to impede edge portions of the glass flow therealong and thereby provide more uniform thickness across the width of the delivered sheet.

---

In the manufacture of glassware, the usual procedure is to flow the molten glass from a melting and refining tank and through a forehearth channel. When the molten glass reaches the forward end of the channel, the glass is delivered in a shape dependent upon the articles to be manufactured.

In a delivery operation wherein sheet glass is required, the molten glass flows over a sloping delivery lip. Where edge glass flows down the lip with no impedance to the edge glass' flow, such edge glass tended to give a feather-edge configuration to the delivered sheet glass. Feather-edged sheet evidences a crowned effect wherein the center glass is thicker than the glass along the two lateral edges. Another problem manifested in over the lip delivery is a necking down of the lateral width of the glass as the edge glass loses contact and pulls away from the lateral walls along the delivery lip. Resulting temperature distribution is not uniform throughout the sheet glass and problems during subsequent forming operations ensue.

Presently, one method of producing sheet glass material introduces a relatively narrow stream of molten glass which flows into an elongated slotted channel wherein a widening of the stream of molten glass produces the final glass form. The difficulty with this method is a temperature loss due to excessive distance between the delivery operation and the forming operation plus a non-uniform temperature distribution due to widening of the stream of molten material.

Another present method delivers molten material from a narrow delivery lip onto sizing rolls for subsequent forming. To produce sheet glass of any significant width, the molten glass is allowed to puddle or pile up on the roll and spread laterally to the desired width before further rolling. Disadvantageous temperature distribution results and creates rolling or forming problems. Imperfections, such as ream, result from the fact that molten glass piles up against the top roll and becomes chilled prior to passing between the rolls and becoming sheet glass.

My invention not only alleviates the problem of lip delivered glasses necking down and exhibiting feather edges as the sheet moves to a forming means, but also provides more uniform homogeneity to the glass delivered. Basically my invention relates to impeder blocks which provide more efficient control of sheet glass thickness than any previous method and apparatus used. By impeding temporarily the edge glass in an over the lip delivery system and redistributing the glass more evenly, I provide a uniform thickness of sheet material with even temperature distribution.

It thus has been an object of my invention to provide impeder blocks on the lateral sides of a delivery lip to provide a glass stream of uniform cross section flowing to a forming means.

A further object of my invention is to eliminate feather-edge and non-uniform temperature distribution in a stream of glass flowing over a delivery lip.

It has been a further object of my invention to provide uniform flow to forming rolls such that there are even side to center to side velocities.

A further object of my invention is to provide a constant glass depth across the delivery lip.

A further object of my invention is to provide a constant puddle size for the entire width of the forming rolls for any given flow.

A further object of my invention is to provide a uniform glass stream flow down a sloped delivery lip by proper contouring of side or impeder blocks.

A further object of my invention is to give more uniform homogeneity to feed glass flowing down a sloped delivery lip.

Other objects and advantages of the invention will be shown in the following detailed description of a preferred embodiment thereof as illustrated in the accompanying drawings in which.

Figure 1:
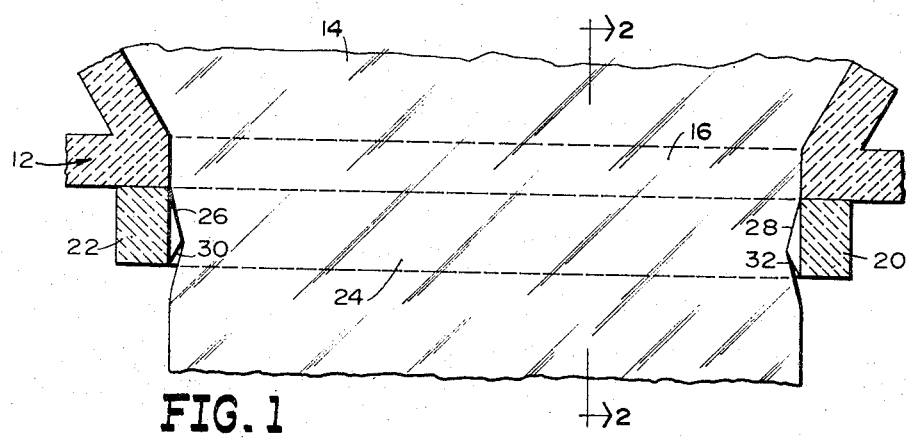
FIG. 1 is a sectional plan view of the delivery end of a glass forehearth embodying my invention on a delivery lip.
Figure 2:
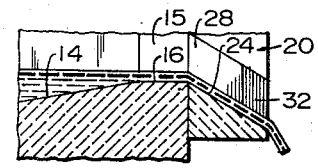
FIG. 2 is a sectional elevational view of the delivery end taken along line 2—2 in FIG. 1.
Figure 3:
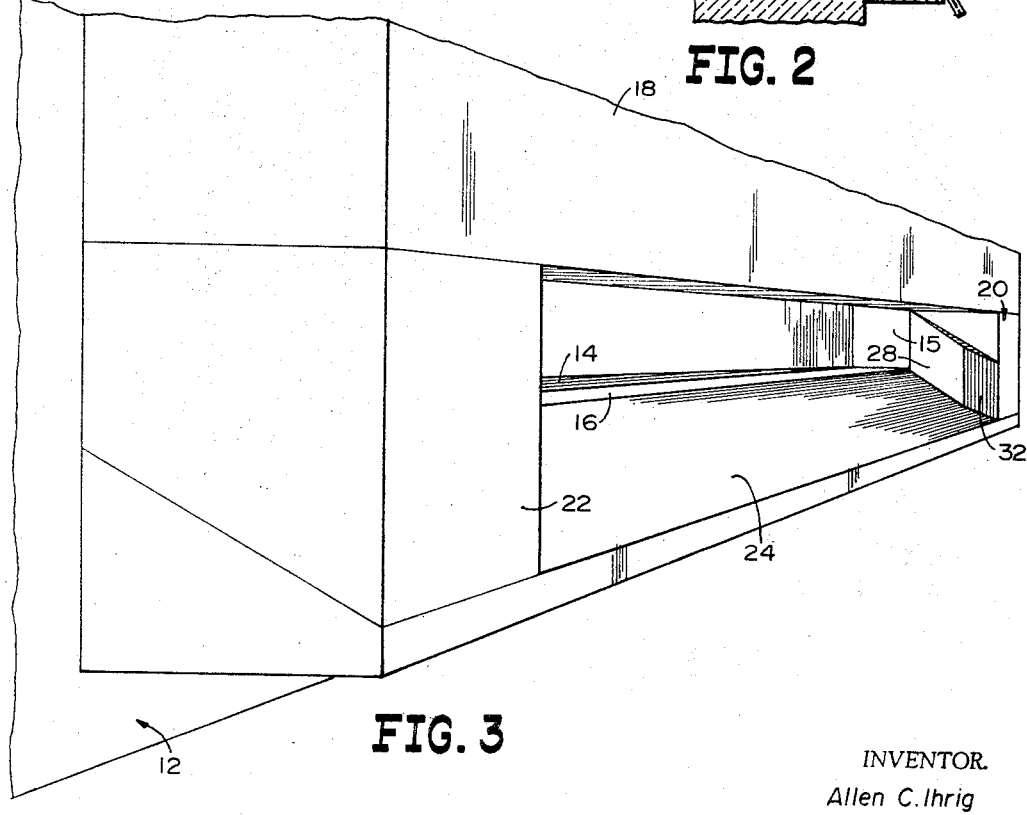
FIG. 3 is a prospective view illustrating one form of the impeder block of the present invention as utilized with a sloped delivery lip in a glass-making forehearth.

A glass making forehearth delivery end 12 provides glass for a conventional forming means. An upwardly sloping, laterally narrowing transition portion 14 controls velocity of glass flow. As the transition section 14 becomes shallower, it provides a relatively flat, glass flow front. The flowing glass traverses a shallow channel section 15 formed by a weir block 16, without changing its flow characteristics. Cover block or jack arch 18 may be of any known configuration and is supported at its ends by specially formed impeder side blocks 20 and 22.

Uniform glass stream flow on a downwardly sloped delivery lip 24 is obtained by contouring inner surfaces of the side block to function as impeder blocks 20 and 22 adjacent the lateral edges of such downwardly sloped delivery lip 24.

In a preferred embodiment the downwardly sloped delivery lip 24 varies downwardly from the horizontal by 30°. The practical range over which the sloped delivery lip 24 varies from the horizontal ranges between 20° to 45°. With a flatter variance from the horizontal, insulation and forming machinery could not be properly placed under the delivery lip. If the variance from the horizontal is greater than 45°, center glass free-falls and a glass with varying velocity is delivered to the forming means.

Without impeder blocks 20 and 22, the glass itself controlled the flow. As glass flowed down the lip 24, its width necked down in such a fashion that the final width of sheet material delivered to a forming means could not be predicted. Head and viscosity of the glass regulated the flow. A feather-edge configuration was produced by the glass flowing over the center of the weir block 16 and on down the center of delivery lip 24 being thicker than the glass along the lateral edges of the flowing sheet.

To prevent feather edging glass, deflecting sections 26 and 28 of impeder blocks 20 and 22 deterred the flow of glass passing from weir block 16. The glass deflecting sections 26, 28 are convergent and protrude or incline inwardly from the lateral line of glass flow and thus narrow the path available to the flowing material. Re-entrant sections 30 and 32 of impeder block 22 and 20, respectively, incline or diverge outwardly and each intersects its impeder block at a point on an extended lateral line of the weir block extremities.

The impeder blocks thus provide a maximum impedance point at which a constricting or damming effect on the edge glass takes place. Releasing the edge glass to its original width under the influence of the re-entrant sections 30 and 32 causes the glass to flow forward at its original width with a constant thickness. Even temperature distribution and more uniform homogeneity are exhibited in the delivered glass. In my present embodiment, the maximum variance of the glass deflecting sections and re-entrant sections from the extended lateral line of the weir block varies from 3/4 inch to 1 1/4 inches.

As already stated, the impeder blocks divert and temporarily impede the glass stream flow at its lateral edges and then release the flow to its original width. The glass thus delivered is of uniform cross section as it flows to a forming means, with an even velocity profile from side to side of the stream. A constant puddle size for the entire width of a forming means is available for any given flow.

Although in the foregoing there has been shown and described the preferred embodiment of the invention, it is to be understood that minor changes in the details of constructions and combination of units may be resorted to without parting from the spirit and scope of the invention as claimed.

I claim:

1. Apparatus for delivering molten sheet glass including a delivery channel, means for supplying molten glass to such channel, a weir block at the forward end of said channel, and a downwardly sloped delivery lip abutting said weir block for flowing a broad flat delivery stream thereover, wherein the improvement comprises a pair of opposed impeder blocks, one such impeder block being positioned adjacent each lateral edge of said delivery lip, and each impeder block having means protruding therefrom which extend laterally-inwardly of said delivery lip to impede edge portions of the flow over such lip and provide for improved thickness uniformity in the delivered sheet.

2. Improved apparatus as defined in claim 1 wherein each said protruding means is provided with a re-entrant portion which communicates with its impeder block adjacent a delivery edge of said lip.

3. Improved apparatus as defined in claim 1 wherein said protruding means is formed integrally with each said impeder block, and has a triangular plan view configuration.

4. In apparatus for delivering molten sheet glass over a lip member wherein a supply of molten glass communicates with the upper end of an inclined delivery lip having bounding sidewall portions, the improvement which comprises, means projecting inwardly of said sidewall portions for impeding edge portions of the glass flow along said delivery lip, and said impeding means forming a restricted portion intermediate the ends of said lip.

References Cited

UNITED STATES PATENTS

| | | | |
|---|---|---|---|
| 1,564,240 | 12/1925 | Hitchcock | 65—182 XR |
| 1,681,258 | 8/1928 | Rowley | 65—91 |
| 1,735,595 | 11/1929 | Blair | 65—326 XR |
| 2,286,323 | 6/1942 | Weber et al. | 65—99 XR |
| 2,838,880 | 6/1958 | Bailey et al. | 65—325 XR |

DONALL H. SYLVESTER, *Primary Examiner.*

S. LEON BASHORE, *Examiner.*

F. W. MIGA, *Assistant Examiner.*